United States Patent [19]

Miyata et al.

[11] Patent Number: 5,029,068
[45] Date of Patent: Jul. 2, 1991

[54] NC DATA CREATION METHOD

[75] Inventors: Mitsuto Miyata; Teruyuki Matsumura, both of Tokyo, Japan

[73] Assignee: Fanuc Ltd., Minamitsuru, Japan

[21] Appl. No.: 362,448

[22] PCT Filed: Sep. 30, 1988

[86] PCT No.: PCT/JP88/01004

§ 371 Date: Jun. 2, 1989

§ 102(e) Date: Jun. 2, 1989

[87] PCT Pub. No.: WO89/03549

PCT Pub. Date: Apr. 20, 1989

[30] Foreign Application Priority Data

Oct. 6, 1987 [JP] Japan .................. 62-291253

[51] Int. Cl.$^5$ ............................... G05B 19/18
[52] U.S. Cl. ..................... 364/191; 364/474.22
[58] Field of Search ................ 364/188-192, 364/184, 474.21, 474.22, 474.23, 474.24, 200 MS File, 900 MS File, 518, 521, 522

[56] References Cited

U.S. PATENT DOCUMENTS

| 4,209,847 | 6/1980 | Noda et al. | 364/474.23 |
| 4,488,258 | 12/1984 | Struger et al. | 364/900 |
| 4,587,608 | 5/1986 | Kishi et al. | 364/474.23 |
| 4,723,203 | 2/1988 | Kishi et al. | 364/474.23 |
| 4,750,105 | 6/1988 | Ohkawa et al. | 364/474.27 |
| 4,799,143 | 1/1989 | Tanaka et al. | 364/191 |
| 4,815,014 | 3/1989 | Lipnev et al. | 364/188 |

Primary Examiner—Jerry Smith
Assistant Examiner—Jim Trammell
Attorney, Agent, or Firm—Staas & Halsey

[57] ABSTRACT

Comment statements (CMS1, CMS2) are inserted after T-codes (TC1, TC2) for tool selection in an NC machining program (1) created conversationally. The comment statements including information relating to tools in the T-codes and/or information relating to a machining processes performed by the tools.

3 Claims, 6 Drawing Sheets

FIG. 3

| ID NO. ID | TOOL NO. TN | REVISION NO. TM | TOOL NOSE RADIUS PN | BLADE ANGLE AC | TOOL NOSE ANGLE AN | MOUNTING ANGLE AS |
|---|---|---|---|---|---|---|
| 100 | 03 | 03 | 0.8 | 30 | 55 | -90 |
| 110 | 02 | 02 | 0.4 | 5 | 55 | -90 |
| ⋮ | ⋮ | ⋮ | ⋮ | ⋮ | ⋮ | ⋮ |

FIG. 5

| PROCESS | MACHINING TYPE | TOOL ID NO. | TOOL NO. | REVISION NO. | --- |
|---|---|---|---|---|---|
| 01 | OUTER-DIAMETER ROUGH CUTTING | 100 | 03 | 03 | -- |
| 02 | INNER-DIAMETER ROUGH CUTTING | 110 | 02 | 02 | -- |
| ⋮ | ⋮ | ⋮ | ⋮ | ⋮ | ⋮ |

:
        :                      ─ MPn
        :
    : M 30 :
```

NC DATA CREATION METHOD

DESCRIPTION

1. Technical Field L This invention relates to an NC data creation method and, more particulary, to an NC data creation method in which a command statement is inserted after a T-code for tool selection.

2. Background Art

An automatic programming system is available in which a conversational screen conforming to each step of a plurality of data input steps is displayed on a display unit and NC statements (NC data) executable by an NC unit are created using data entered while referring to the conversational screens. For example, see U.S. Pat. No. 4,723,203 ("Machining Process Determination Method in Automatic Programming"). Such an automatic programming system includes the following steps, which will be described with reference to FIG. 6:

(1) a first step of selecting execution of "automatic programming";
(2) a second step of selecting data to be entered (step to be executed next)
(3) a third step of selecting a blank material;
(4) a fourth step of selecting surface roughness;
(5) a fifth step of selecting design drawing format;
(6) a sixth step of entering blank profile and its dimensions;
(7) a seventh step of entering a part profile and its dimensions;
(8) an eighth step of entering machine origin and turret position;
(9) a ninth step of selecting a machining process;
(10) a tenth step of selecting a tool and entering tool data;
(11) an 11th step of deciding machining conditions;
(12) a 12th step of entering cutting direction
(13) a 13th step of entering cutting limits;
(14) a 14th step of entering whether there is an area cut by the same tool; and
(15) a 15th step of calculating tool path (i.e., of creating an NC data statement).

In accordance with these steps, predetermined prompts (conversational screens) are successively displayed on a display screen, the operator enters the required data from a keyboard in response to these prompts and finally an NC statement is created using all of the entered data. It should be noted that the conversational inputs from the ninth step to the 14 step are made repeatedly until all machining process data have been entered.

The NC statement created by the foregoing method has NC statements MP1, MP2, ... MPn (see FIG. 7) for machining processes entered in sequence by repeating the ninth through 14th steps. Specified in each NC statement for a machining process are NC data (G50X_Y_) for setting a coordinate system, a T-code (T_) for selecting a tool, and NC data (G01X_Y_;..) for a tool path.

With this conventional NC statement format, however, it is difficult to tell merely from looking at the NC statements what tool is being used for what process; hence, checking and revising the NC statements is not easy. Further, the tool number_in the T-code (T_) for tool selection indicates the tool position on a turret on which a plurality (six to ten) tools are mounted. Since it is not known whether the same tool will always be mounted at the same position on the turret, one cannot immediately tell merely from looking at the T-code of the NC statement what the tool is.

SUMMARY OF THE INVENTION

Accordingly, an object of the present invention is to provide an NC data creation method wherein the type of a tool, the process in which the tool is used, etc., can be recognized merely by looking at an outputted NC statement, and wherein it can be readily ascertained what part of an NC statement is for a machining process and what the process is.

In an NC data creation method according to the invention, a comment statement is inserted after a T-code for tool selection, the comment statement including information relating to a tool in the T-code and/or information relating to a machining process performed by the tool.

BRIEF DESCRIPTION OF THE DRAWINGS

FIG. 3 is a table for describing a tooling file;

FIGS. 4 and 5 are views for describing a machining process file;

FIG. 7 is a view for describing conventional NC statements.

DESCRIPTION OF THE PREFERRED EMBODIMENT

Figure 1:
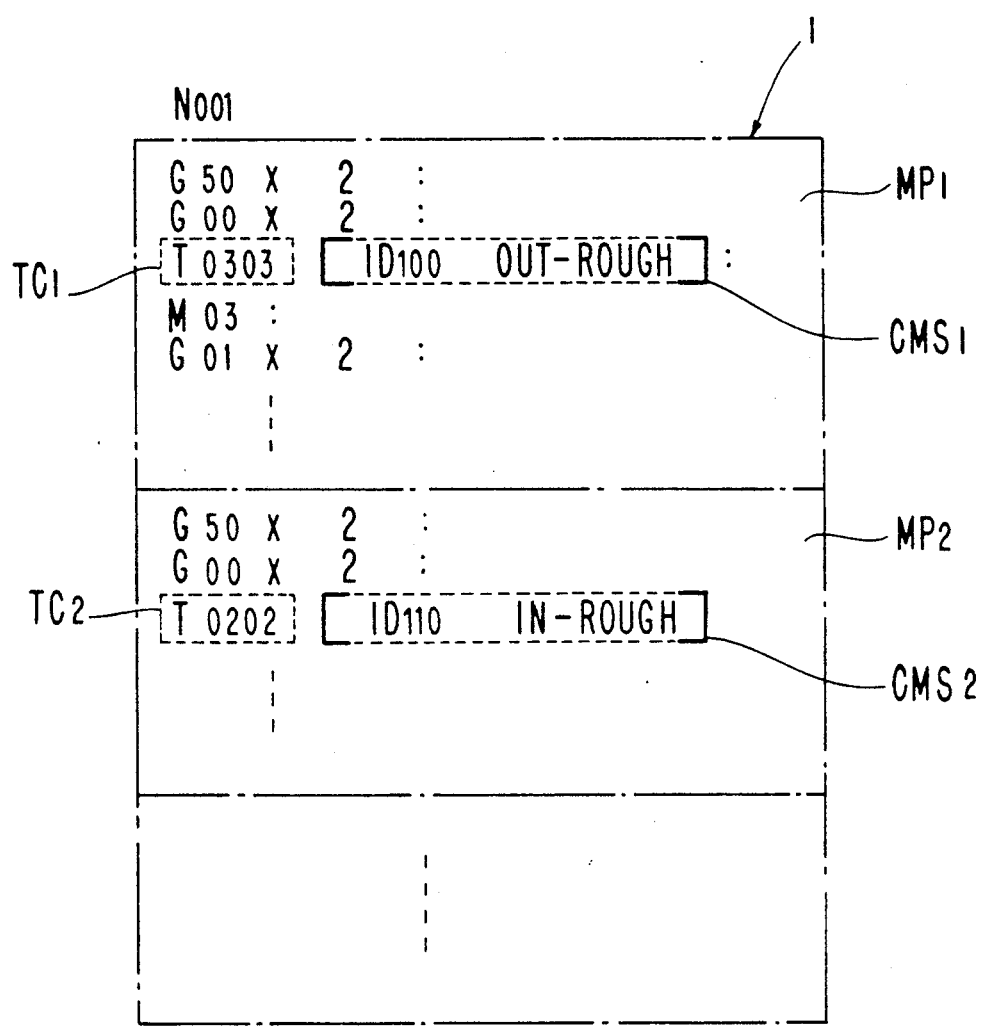
FIG. 1 is a view for describing the general features of the present invention.

FIG. 1 is a view for describing the general features of the present invention.

Numeral 1 denotes an NC statement, MP1. MP2, ... represent NC statements for respective machining processes, TC1, TC2 designate T-codes for selecting tools, and CMS1, CMS2 denote comment statements.

The comment statements CMS1, CMS2 are inserted after the tool selection T-codes TC1, TC2 of the NC statement 1 created based on data entered via a plurality of data input steps, each of the comment statements CMS1, CMS2 comprising information relating to the tool of the T-code and/or information relating to the machining process performed by the tool. This information is enclosed in brackets.

When an NC statement is outputted (printed out, displayed, etc.), the statement is outputted inclusive of the comment statement, which is ignored when numerical control is performed.

Figure 2:
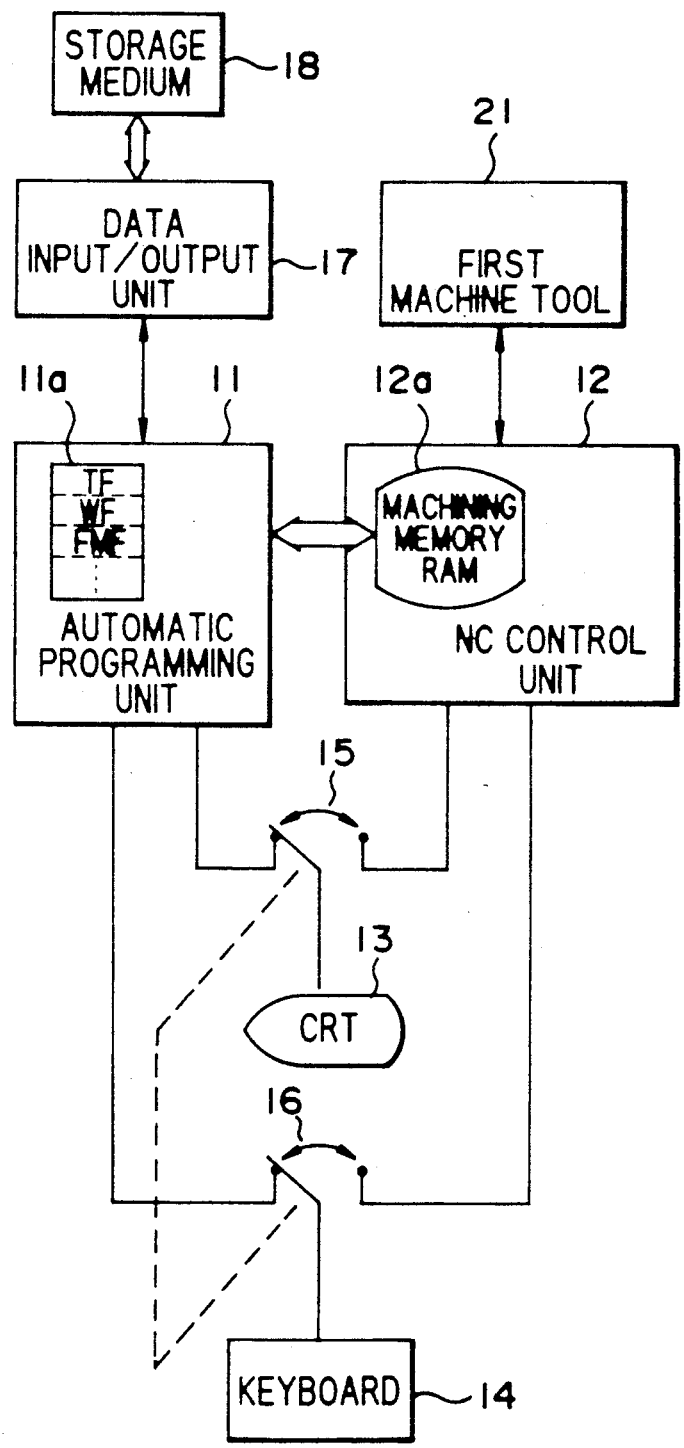
FIG. 2 is a block diagram of a system for practicing the method of the invention.

FIG. 2 is a block diagram of a system for practicing the method of the present invention. Numeral 11 denotes an automatic programming unit, 12 an NC control unit, 13 a graphic display unit (CRT), 14 a keyboard, 15, 16 changeover units, 17 a data input/output unit, 18 a program storing medium such as a bubble cassette memory, and 21 a machine tool.

The automatic programming unit 11 and NC control unit 12 are constituted by microcomputer and incorporate a processor, a control program memory (ROM) and a RAM. A RAM 11a of the automatic programming unit 11 stores a tooling file TF, workpiece file WF, a created family program FMF and NC statements, etc. An NC data statement on the basis of which NC control is presently being performed is stored in a RAM 12a of the NC control unit 12.

As shown in FIG. 3, the tooling file TF is such that tool numbers of tools, tool revision numbers, tool nose radii, blade angles and mounting angles correspond to tool management numbers ID.

Figure 4:
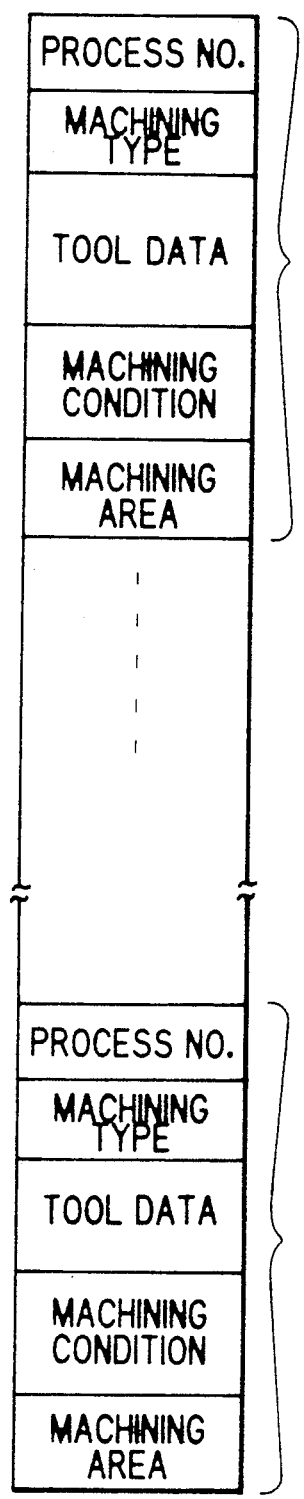
Figure 6:
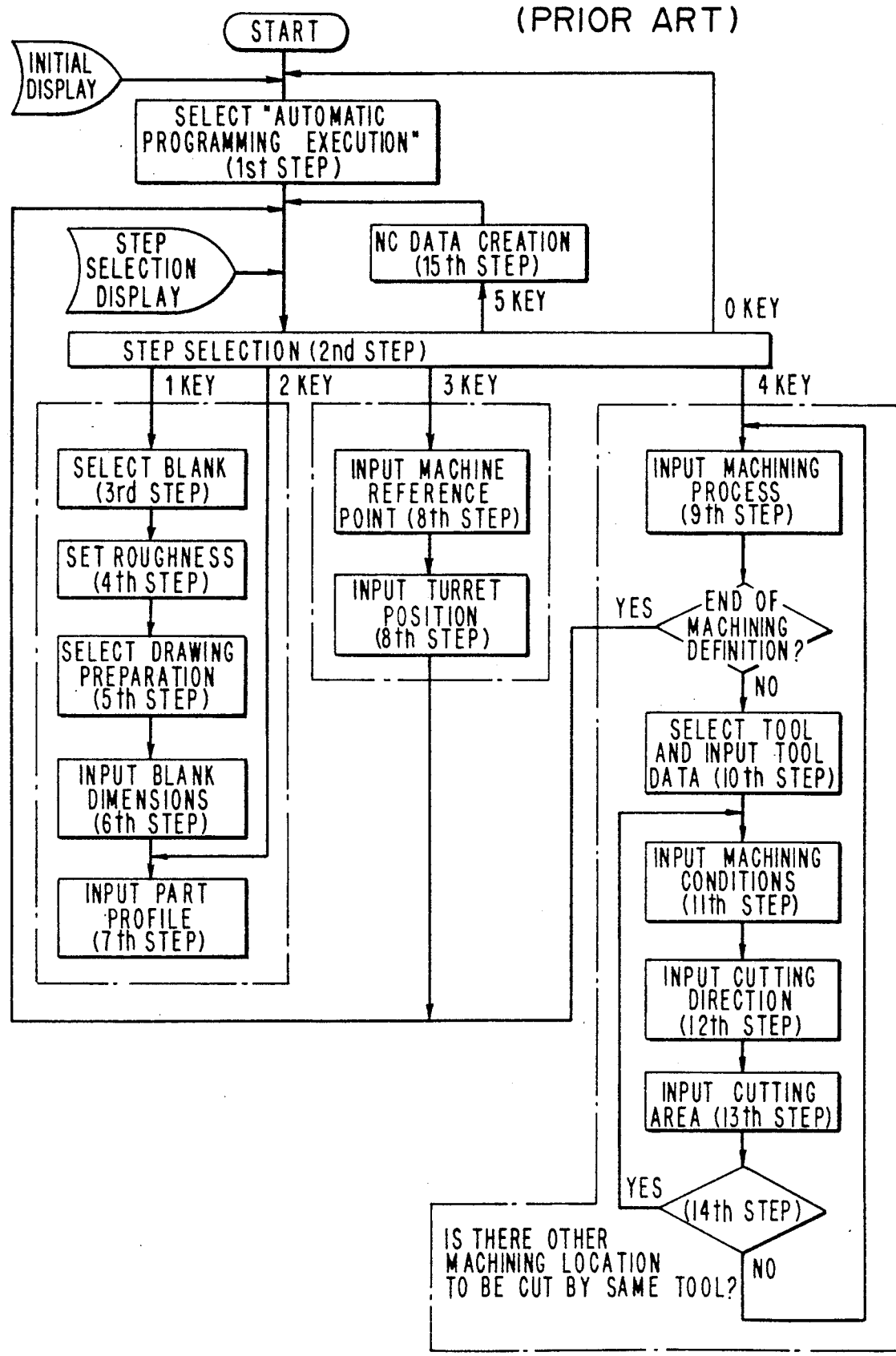
FIG. 6 is a flowchart of automatic programming processing.

In the automatic programming mode, a family program is created by entering data necessary for NC statement creation in accordance with the first through 14th steps shown in FIG. 6, just as in the prior art. The family program is stored in the RAM 11a. It should be noted that the data stored in the RAM include a machining process file created by repeating the ninth through 14 steps of FIG. 6. As shown in FIG. 4, the machining process file includes, for every machining process, a process number, a machining type (machining process name), tool data, machining conditions and machining area data. These are arrayed in the order of the entered machining processes. After all data have been entered, NC data are created in the 15th step of FIG. 6. When a tool selection T-code is outputted in this case, tool information (e.g., tool management number) and the machining process are obtained by referring to the machining process file, and these are outputted as a comment statement enclosed in brackets. It should be noted that rough machining of outer diameter is expressed by OUT-ROUGH, rough machining of inner diameter by IN-ROUGH, end-face rough machining by FACE-ROUGH, and finishing machining of outer diameter by OUT-FIN, etc.

Assume by way of example that rough machining of outer diameter and rough machining of inner diameter are designated as first and second machining processes, respectively, and that tool management numbers 100, 110 (see FIG. 3) are designated as the tools used in these processes, respectively. The automatic programming unit 11 will then create a machining process table (only a part of which is shown), as illustrated in FIG. 5, by obtaining the tool numbers and tool revision numbers by referring to the tooling file, and, at the time of NC data creation, will output the NC statement 1 having the comment statements CMS1, CMS2 inserted after the tool selection T-codes TC1, TC2, as shown in FIG. 1, by referring to the machining process file. In numerical control, the comment statements enclosed in brackets are ignored.

Thus, in accordance with the present invention, the arrangement is such that a comment statement is inserted after a T-code for tool selection, the comment statement including information relating to a tool in the T-code and/or information relating to a machining process performed by the tool. As a result, the type of a tool, the process in which the tool is used, etc., can be recognized merely by looking at an outputted NC statement, and it can be readily ascertained what part of an NC statement is for a machining process and what the process is.

What is claimed is:

1. An NC data creation method in an automatic programming apparatus for creating NC data executable by an NC unit based on conversationally entered data, comprising the steps of:

storing names of machining processes and tool data used in the machining processes as respective comment statements including at least of information based on a tool in said T-code and information based on a machining process performed by said tool; automatically selecting one of the names corresponding to a T-code;

automatically inserting the selected name as a comment statement after the T/code when NC data is created; and outputting the comment statement together with the NC data.

2. An NC data creation method according to claim 1, further comprising the step of:

outputting said selected means enclosed in brackets.

3. An NC data creation method according to claim 2, further comprising the step of:

ignoring said selected name enclosed in brackets when executing NC data.

* * * * *

UNITED STATES PATENT AND TRADEMARK OFFICE
CERTIFICATE OF CORRECTION

PATENT NO. : 5,029,068
DATED : July 2, 1991
INVENTOR(S) : MIYATA et al.

It is certified that error appears in the above-identified patent and that said Letters Patent is hereby corrected as shown below:

Title page, item [30] "62-291253" should be --62-252258--.

Col. 4, line 35, "means" should be --name--.

Signed and Sealed this

Twenty-fourth Day of November, 1992

Attest:

DOUGLAS B. COMER

Attesting Officer

Acting Commissioner of Patents and Trademarks